US 9,155,094 B2

(12) United States Patent
Jeon et al.

(10) Patent No.: US 9,155,094 B2
(45) Date of Patent: Oct. 6, 2015

(54) METHOD AND APPARATUS FOR SELECTING FREQUENCY ALLOCATION IN WIRELESS COMMUNICATION SYSTEM

(75) Inventors: Joseph Jeon, Seongnam-si (KR); Byoung-Ha Yi, Seoul (KR); Ki-Young Han, Yongin-si (KR); Hee-Kwun Cho, Incheon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 694 days.

(21) Appl. No.: 13/034,604

(22) Filed: Feb. 24, 2011

(65) Prior Publication Data

US 2011/0207492 A1    Aug. 25, 2011

(30) Foreign Application Priority Data

Feb. 24, 2010   (KR) .................. 10-2010-0016614

(51) Int. Cl.
*H04W 72/04*   (2009.01)
*H04W 72/08*   (2009.01)
*H04W 24/02*   (2009.01)

(52) U.S. Cl.
CPC .......... *H04W 72/0426* (2013.01); *H04W 24/02* (2013.01); *H04W 72/082* (2013.01)

(58) Field of Classification Search
CPC .......... H04W 72/082; H04W 72/0426; H04W 24/02
USPC ....................................................... 455/509
See application file for complete search history.

(56) References Cited

U.S. PATENT DOCUMENTS

| 6,108,321 | A  | * | 8/2000  | Anderson et al. ............. 370/329 |
| 7,373,151 | B1 | * | 5/2008  | Ahmed ....................... 455/452.2 |
| 2007/0097939 | A1 | * | 5/2007  | Nylander et al. ............. 370/338 |
| 2007/0105583 | A1 | * | 5/2007  | Gerlach ........................ 455/522 |
| 2010/0093364 | A1 | * | 4/2010  | Ribeiro et al. ............. 455/452.2 |
| 2010/0113060 | A1 | * | 5/2010  | Bai et al. ........................ 455/453 |
| 2010/0136996 | A1 | * | 6/2010  | Han et al. .................... 455/452.1 |
| 2010/0157910 | A1 | * | 6/2010  | Nentwig et al. ............... 370/329 |
| 2010/0273468 | A1 | * | 10/2010 | Bienas et al. .................. 455/418 |
| 2011/0002314 | A1 | * | 1/2011  | Choi et al. .................... 370/338 |
| 2011/0183678 | A1 | * | 7/2011  | Kerpez et al. ................. 455/450 |
| 2011/0183680 | A1 | * | 7/2011  | Yi et al. ........................ 455/450 |
| 2011/0201378 | A1 | * | 8/2011  | Lee et al. ...................... 455/522 |
| 2011/0218005 | A1 | * | 9/2011  | Jeon et al. ..................... 455/509 |
| 2011/0230226 | A1 | * | 9/2011  | Han et al. ...................... 455/522 |
| 2012/0250563 | A1 | * | 10/2012 | Liu et al. ....................... 370/252 |

* cited by examiner

*Primary Examiner* — Bobbak Safaipour
*Assistant Examiner* — Devan Sandiford

(57) ABSTRACT

A method and an apparatus select optimized Frequency Allocation (FA) in a mobile communication system that includes mobile base stations. A first control information is received from neighbor base stations. System capacities of the respective neighbor base stations are determined based on the first control information. The FA that maximizes a sum of the system capabilities of the respective neighbor base stations is selected. Therefore, the method has an advantage of securing maximum capacity by adaptively setting FA with consideration of radio environments of neighbor base stations during network entry of a new mobile base station or during an operation of a mobile base station.

29 Claims, 4 Drawing Sheets

METHOD AND APPARATUS FOR SELECTING FREQUENCY ALLOCATION IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119 to an application filed in the Korean Intellectual Property Office on Feb. 24, 2010 and assigned Serial No. 10-2010-0016614, the contents of which are incorporated herein by reference.

TECHNICAL FIELD OF THE INVENTION

The present invention relates to a mobile base station. More particularly, the present invention relates to a method and an apparatus for dynamically selecting Frequency Allocation (FA) in a communication system in which base stations may move.

BACKGROUND OF THE INVENTION

A mobile base station is deployed in a communication network or a public security network, or an area that temporarily requires a wireless service. Unlike a fixed base station which an operator deploys and manages through a cell plan and a driving test, the mobile base station is placed in serviced and managed based on a variably changing position. In this environment, when a user powers-on a mobile base station, the mobile base station should be automatically installed and optimized. In addition, the mobile base station should adapt to an installation environment to determine the FA to be used, transmission (Tx) power, a cell Identifier (ID), and such, and provide a service to a terminal.

As described above, because the mobile base station is mainly used for a special purpose, its arrangement is very irregular, and sometimes, substantial overlapping between base stations may occur. When proper FA selection and Tx power control are not performed in an area where such cell coverage overlaps, a system capacity may be reduced. In addition, because it is difficult to predict an arrangement sequence, and movement of the mobile base station and topology of the mobile base station frequently changes, it is desirable to selectively set FA and Tx power such that each base station improves capacity of a system in a distributed manner rather than to set parameters of a plurality of base stations at one time. Each base station repeatedly performs a setting such that a system capacity improves through FA change of the base station, and such that an entire base station FA may be set at its optimum state. In addition, location information of a base station is utilized for estimation of Path Loss (PL) between neighbor base stations during initial installation, such that an optimized FA setting may be possible.

Therefore, a method and an apparatus for automatically selecting FA in a distributed manner using location information in order to maximize capacity under a cell overlap environment generated due to mobile base stations are required.

SUMMARY OF THE INVENTION

To address the above-discussed deficiencies of the prior art, it is a primary aspect of the present invention to address at least the above-mentioned problems and/or disadvantages and to at least provide the advantages described below. Accordingly, an aspect of the present invention is to provide a method and an apparatus for selecting an optimized FA in a mobile communication system that includes mobile base stations.

Another aspect of the present invention is to provide a method and an apparatus for automatically selecting FA in a distributed manner using location information in order to maximize capacity under a cell overlap environment generated due to mobile base stations.

In accordance with an aspect of the present invention, a method for selecting Frequency Allocation (FA) in a mobile communication system is provided. The method includes receiving a first control information from neighbor base stations. System capacities of the respective neighbor base stations are determined based on the first control information. And the FA that maximizes a sum of the system capacities of the respective neighbor base stations is selected.

In accordance with another aspect of the present invention, a method for selecting Frequency Allocation (FA) in a mobile communication system is provided. The method includes receiving a first control information from neighbor base stations. Candidate neighbor base stations are selected from the neighbor base stations based on the first control information. And the FA that maximizes a sum of system capacities of the respective candidate neighbor base stations is selected.

In accordance with still another aspect of the present invention, an apparatus for selecting Frequency Allocation (FA) in a mobile communication system is provided. The apparatus includes a transceiver for receiving a first control information from neighbor base stations. An FA determining unit determines system capacities of the respective neighbor base stations based on the first control information and selects the FA that maximizes a sum of the system capacities of the respective neighbor base stations.

In accordance with yet another aspect of the present invention, an apparatus for selecting Frequency Allocation (FA) in a mobile communication system is provided. The apparatus includes a transceiver for receiving a first control information from neighbor base stations. An FA determining unit selects candidate neighbor base stations from the neighbor base stations based on the first control information and selects the FA that maximizes a sum of system capacities of the respective candidate neighbor base stations.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

Figure 1:
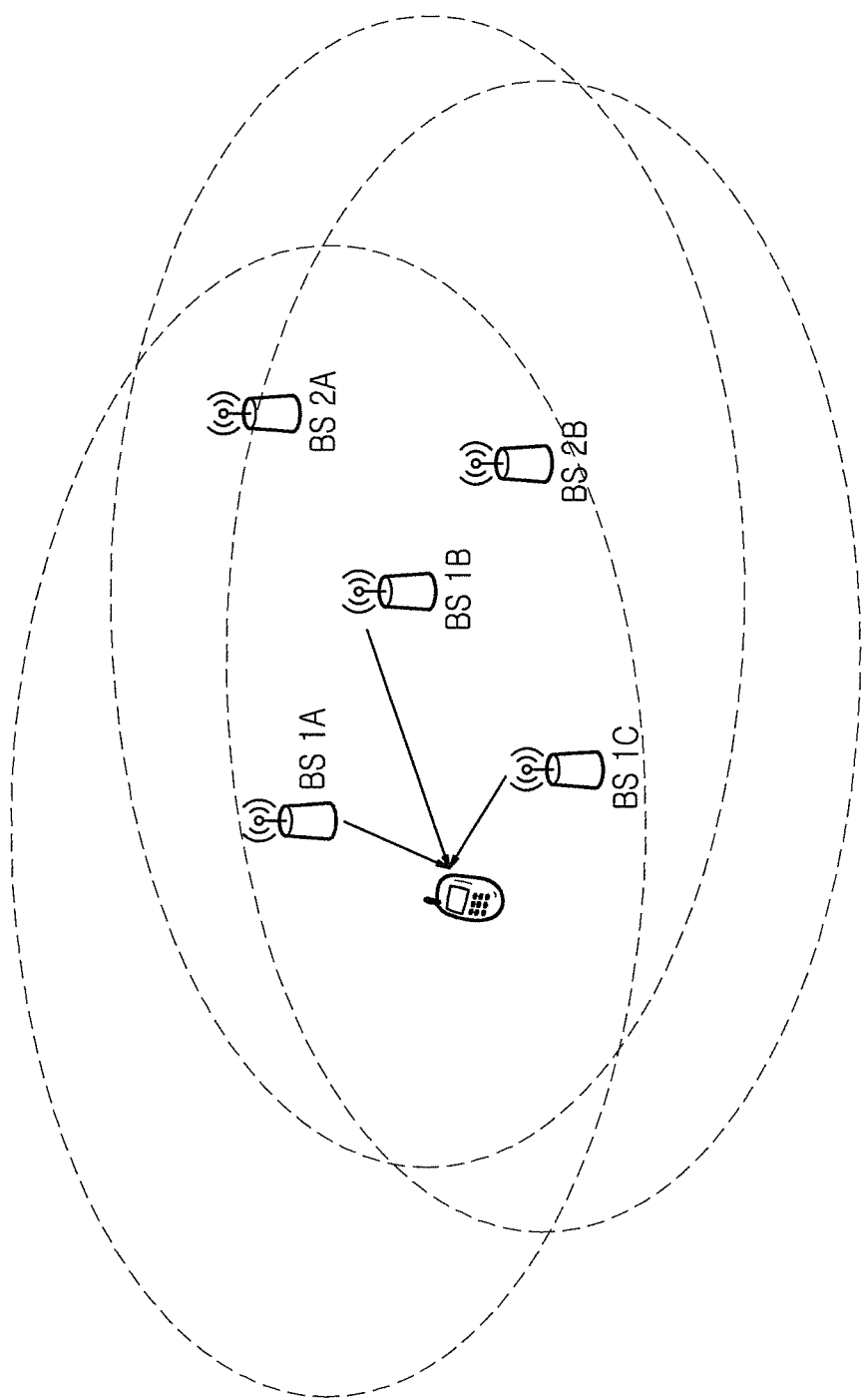
FIG. 1 illustrates a mobile communication system that includes mobile base stations according to an embodiment of the present invention.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Embodiments of the present invention will be described below with reference to the accompanying drawings. In the following description, well-known functions or constructions are not described in detail as they would obscure the invention. Terminologies described below are defined with consideration of functions in the present invention, and may change based upon preferences or practice of a user or operator. Therefore, the definitions should be determined on the basis of the descriptions in the present specification.

Embodiments of the present invention provide a method and an apparatus for selecting dynamic FA in a mobile communication system that includes mobile base stations.

Hereinafter, a process for deriving a conditional equation for maximizing service capacity when a plurality of mobile base stations exist is described.

The capacity of N mobile base stations may be expressed in terms of a sum of average capacities of the respective mobile base stations. In this situation, the capacity may be expressed by Equation 1 below.

$$C_{total} = \sum_{n=1}^{N} C_{avg}^{n} \quad \text{[Eqn. 1]}$$

where n is an index of a mobile base station, $C_{total}$ is the total system capacity, and $C_{avg}^{n}$ is an average capacity of an n-th mobile base station.

In Equation 1, $C_{avg}^{n}$ is an average capacity of an n-th mobile base station. Throughput of each point may be expressed in terms of a function of Signal-to-Interference-plus-Noise-Ratio (SINR) by Equation 2 below.

$$C_{avg}^{n} = \frac{1}{A_n} \int\int_{A_n} f(\log(1 + SINR_{x,y})) dx dy \quad \text{[Eqn. 2]}$$

$$= \frac{1}{A_n} \int\int_{A_n} f\left(\log\left(1 + \frac{P_{rx}^{n}(x, y)}{\sum_{i=1}^{I} g_{i \to n} P_{rx}^{i}(x, y) + N}\right)\right) dx dy$$

In Equation 2, $A_n$ is an area of a cell coverage, $P_{rx}^{n}(x, y)$ is reception power from an n-th femto at a position (x,y), i is an index of a neighbor base station that causes an interference, I is the number of all neighbor base stations that cause an interference, $P_{rx}^{i}(x, y)$ is reception power from an i-th neighbor base station at a position (x,y), and $g_{i \to n}$ is a function that indicates a '1' when the FA of an n-th mobile base station and the FA of a i-th mobile station are the substantially the same, and indicates a '0' otherwise.

Therefore, an objective K for maximizing capacities of a plurality of mobile base stations may be expressed by Equation 3 below.

$$K = \max \sum_{N=1}^{N} \frac{1}{A_n} \int\int_{A_n} \log\left(\frac{P_{rx}^{n}(x, y)}{\sum_{i=1}^{I} g_{i \to n} P_{rx}^{i}(x, y) + N}\right) dx dy \quad \text{[Eqn. 3]}$$

$$= \max \sum_{n=1}^{N} \frac{1}{A_n} \int\int_{A_n} \left(\log(P_{rx}^{n}(x, y)) - \log\left(\sum_{i=1}^{I} g_{i \to n} P_{rx}^{i}(x, y) + N\right)\right) dx dy$$

$$= \max \sum_{n=1}^{N} \left(\frac{\int\int_{A_n} \log(P_{rx}^{n}(x, y)) dx dy}{A_n} - \log\left(\sum_{i=1}^{I} g_{i \to n} P_{rx}^{i}(x, y) + N\right)\right)$$

In Equation 3, assuming that a reception SINR at the coverage boundary of each mobile base station is the same, dB average reception power is substantially the same for every mobile base station, regardless of a coverage size. Therefore, Equation 3 may be changed to Equation 4 below.

$$K = \max\left(\sum_{n=1}^{N} \log\left(\frac{1}{\sum_{i=1}^{I} g_{i \to n} P_{rx}^{i}(x, y) + N}\right)\right) \quad \text{[Eqn. 4]}$$

To calculate an FA set that satisfies Equation 4, a mobile base station m calculates the FA using Equation 5 when performing the calculation in a distribution manner.

$$FA_m = \arg\max\left(\sum_{n=1}^{N} \log\left(\frac{1}{\sum_{i=1}^{I} g_{i \to n} P_{rx}^{i}(x, y) + N}\right)\right) \quad \text{[Eqn. 5]}$$

Reception power included in Equation 5 is a value measurable at each base station. Message exchange such as a form of {BSID, FA, Rx. Power} is used for reception powers of all base stations received for sharing values measured at respective base stations. Each base station broadcasts the message to a network after measuring reception power, or a relevant base station may request the message and receive the message ad hoc.

At this point, a value of reception power from a base station m which a neighbor base station k has received is reflected for each FA when the base station m calculates Equation 5. It is assumed that because there is no signal transmitted by the base station m at initial installation, the signals between two base stations are substantially the same. Therefore, each base station transfers strength of an output signal transmitted by the base station and position information {Tx. Power, Position} together during message exchange.

A reception signal $RxP_{k,m}(dB)$ from a mobile base station k, received by a mobile base station m may be expressed by Equation 6 below.

$$RxP_{k,m}(dB)=TxP_k(dB)+SF_k(dB)+PL(d_{k,m})+SF_m(dB)+N(dB) \quad [\text{Eqn. 6}]$$

where $TxP_k$ is the transmission power of a base station k, $SF_k$ is a Shadowing Factor (SF) of a mobile base station k, and $PL(d_{k,m})$ is a Path Loss (PL) between mobile base stations k and m. N(dB) is a terminal noise, and $SF_k$ of Equation 6 transmits a value estimated by the mobile base station k to the mobile base station m. Therefore, information received by the mobile base station from a neighbor base station k is as follows.

$$Msg(k)=\{\{BSID_i, RxPower_i | i \in N\}, FA_k, TxPower_k, Position_k, SF_k\} \quad [\text{Eqn. 7}]$$

Therefore, reception strength $RxP_{m,k}(dB)$ from the mobile base station m, received by a neighbor base station k during initial installation is estimated by Equation 8.

$$RxP_{m,k}(dB)=TxP_m(dB)+SF_m(dB)+PL(d_{mk})+SF_k(dB)+N(dB)=TxP_m(dB)+RxP_{k,m}(dB)-TxP_k(dB) \quad [\text{Eqn. 8}]$$

To calculate Equation 5, a neighbor base station should transfer a message to the mobile base station m in a form that is substantially similar to that expressed in Equation 7. At this point, to exchange information of all N base stations on a network, messages of $O(N^2)$ should be transferred. Here, $O(N^2)$ is the number of message which is transferred between BSs. Therefore, to raise an algorithm performance efficiency of a distribution manner, Equation 5 may be modified as follows.

$$FA_m = \arg\max \left( \sum_{n=1}^{N(m)} \log \left( \frac{1}{\sum_{i=1}^{I} g_{i \to n} P_{rx}^i(x,y) + N} \right) \right) \quad [\text{Eqn. 9}]$$

where N(m) is a set of base stations whose reception power at the mobile base station m is equal to or greater than $RxP_{threshold}$ or whose distance is less than $d_{threshold}$ from the mobile base station m. The distance condition supplements the situation in which reception power is less than $RxP_{threshold}$ when the transmission power of a neighbor mobile base station is not a maximum. Therefore, when Equations 8 and 9 are used, initial FA may be determined as follows.

$$FA_m = \arg\max \left( \sum_{n=1}^{N(m)} \log \left( \frac{1}{\sum_{i=1,i \neq m}^{I} g_{i \to n} P_{rx}^i + g_{m \to n} RxP_{m,n} + N} \right) \right) \quad [\text{Eqn. 10}]$$

where n is an index for a base station that currently receives a neighbor signal, I is the number of neighbor base stations that cause an interference to the base station n, $g_{i \to n}$ is a function that indicates a '1' when the FA of an n-th mobile base station and FA of a i-th mobile station are substantially the same and indicates a '0' otherwise, and $RxP_{m,n}$ is an intensity of reception power from the mobile base station m, N is a thermal noise, $RxP_{m,n}(dB)$ is reception strength between the mobile base station m, and a neighbor base station n, $g_{m \to n}$ is a function that indicates a '1' when the FA of an m-th mobile base station and FA of a n-th mobile station are the same.

When an individual mobile base station executes Equation 9 after the initial FA is determined by Equation 10, convergence may be ensured when some conditions are met by a game theory. Because the convergence and the game theory depart from the scope of the present invention, description thereof is omitted. When all mobile base stations acquire information through message exchange, each mobile base station converges when a condition in which one base station selects FA at a time is met regardless of an execution sequence.

For this purpose, each base station may meet the condition by using a process of periodically determining an FA decision point according to a unique identifier and a process of preventing a relevant base station from performing FA decision simultaneously with the other base stations by allowing the relevant base station to inform a network of the FA decision when performing the FA decision.

FIG. 1 illustrates a mobile communication system that includes mobile base stations according to an embodiment of the present invention.

Referring to FIG. 1, a fixed base station is disposed such that overlapping of cells is minimized with consideration of inter-cell interference through a cell plan. However, cells may overlap in an environment in which base stations move in a special situation such as military communication.

FIG. 1 illustrates an example in which five mobile base stations are located at similar points and their respective cells overlap.

A technique for distributing FA based on location information in order to maximize a system capacity under a cell overlap environment generated by mobility of mobile base stations is described with reference to FIGS. 2 and 3.

Figure 2:
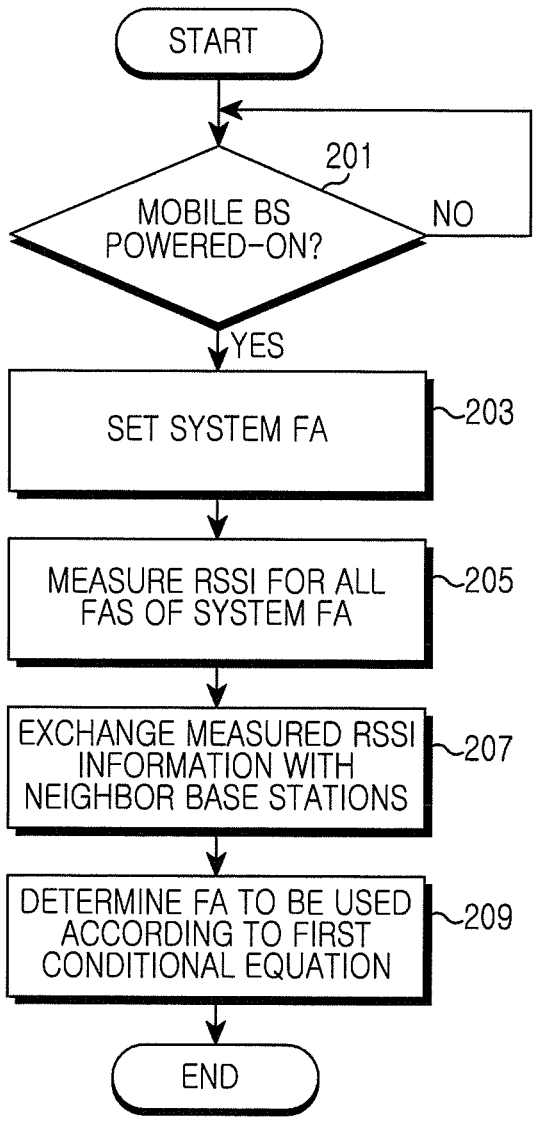
FIG. 2 illustrates a process for selecting an initial FA in a mobile communication system that includes mobile base stations according to an embodiment of the present invention.

FIG. 2 illustrates a process for selecting initial FA in a mobile communication system that includes mobile base stations according to an embodiment of the present invention.

Referring to FIG. 2, when a mobile base station is powered-on in block 201, system FA setting is determined in block 203. The system FA is set of FAs that may be used by the mobile base station. The system FA is not set by the mobile base station but by a Network Management System (NMS).

The mobile base station measures Received Signal Strength Indication (RSSI) for each FA of the system FA in block 205. For example, a reception signal from a mobile base station k, received by a mobile base station m is given by Equation 6.

The mobile base station receives RSSI information from neighbor base stations in block 207. The mobile base station exchanges measured RSSI information by broadcasting the measured RSSI information to a network at a measurement point or by requesting the measured RSSI information and exchanging the same ad hoc.

That is, the mobile base station transmits measured RSSI information of neighbor base stations, first FA information, and first transmission power information to the neighbor base stations, and receives RSSI information of the mobile base station, measured by the neighbor base stations, second FA information, and second transmission power information from the neighbor base stations. The first FA information and the first transmission power are for the mobile base stations, and the second FA information and the second transmission power are for the neighbor base stations.

The mobile base station determines FA to be used based on a first conditional equation in block 209. The first conditional equation is one of Equation 5, Equation 6, and Equation 7. That is, according to the first conditional equation, the mobile base station measures a reception signal from a neighbor base station, exchanges a reception signal measured by neighbor base stations, and then adds a capacity in the form of a log to each of the neighbor base stations to select FA with a maximum capacity.

Figure 3:
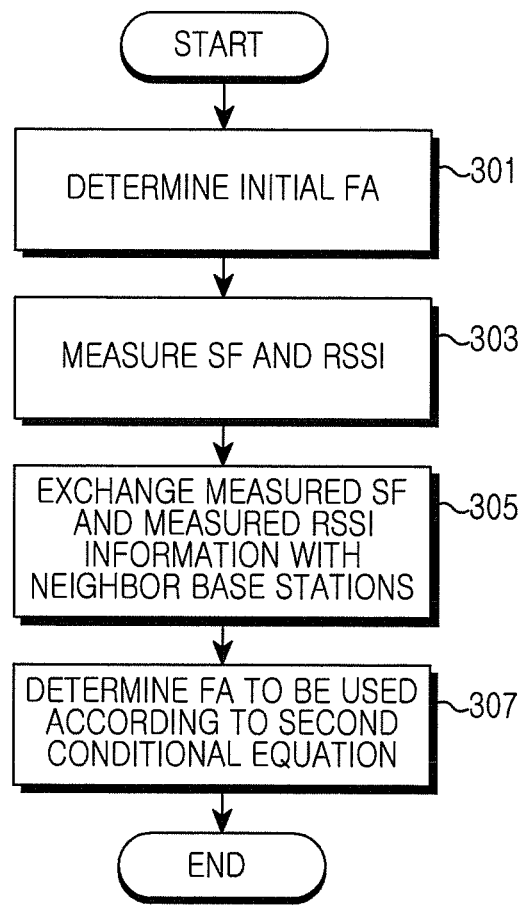
FIG. 3 illustrates a process for selecting FA during an operation in a mobile communication system that includes mobile base stations according to an embodiment of the present invention.

FIG. 3 illustrates a process for selecting FA during an operation in a mobile communication system including mobile base stations according to an embodiment of the present invention.

Referring to FIG. 3, a mobile base station communicates via initially determined FA in block 301.

The mobile base station estimates a Shadowing Factor (SF) and measures RSSI in block 303.

The mobile base station exchanges the estimated SF and the measured RSSI information with neighbor base stations in block 305.

The mobile base station determines FA to be used based on second conditional equation to which the SF has been applied in block 307. The second conditional equation is defined by Equation 11 below.

$$FA_m = \operatorname{argmax}\left( \sum_{n=1}^{N(m)} \log\left( \frac{1}{\sum_{i=1}^{I} g_{i \to n} P_{rx}^i(x, y) + N_{s_n}} \right) \right)$$ [Eqn. 11]

After that, the mobile base station ends the procedure of the present invention.

As described above, a Shadowing Factor (SF) value of an n-th mobile base station does not exist during initial FA decision, but the SF of the n-th mobile base station estimated using a terminal is used while FA is optimized during an operation. In addition, only reception power information is exchanged for each base station during the initial FA decision, but $N_{s_n}$ reflecting the estimated SF is included and exchanged while the FA is optimized during an operation.

During initial FA decision, a neighbor base station uses a value received by a base station n as reception power from the newly installed base station n, but reception power measured by a neighbor base station k is reflected while FA is optimized during an operation.

Figure 4:
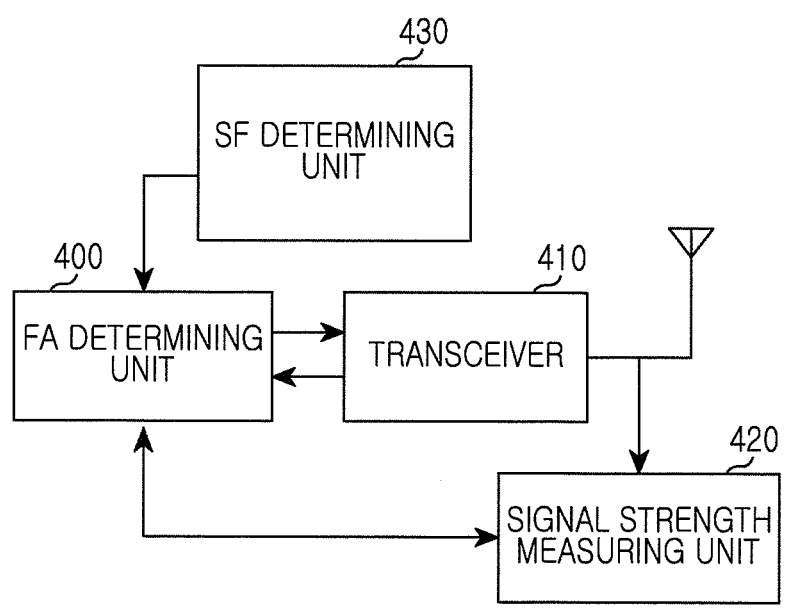
FIG. 4 illustrates an apparatus for selecting FA in a mobile communication system that includes mobile base stations according to an embodiment of the present invention.

FIG. 4 illustrates an apparatus for selecting FA in a mobile communication system including mobile base stations according to an embodiment of the present invention.

Referring to FIG. 4, a mobile base station includes an FA determining unit 400, a transceiver 410, an SF determining unit 430, and a signal strength measuring unit 420.

The transceiver 410 communicates with a backhaul network via a predefined interface or communicates with terminals based on a predefined communication scheme. For example, the transceiver 410 performs encoding/decoding and modulation/demodulation. In addition, when the transceiver 410 is connected with a backhaul network, the transceiver 410 receives information regarding a neighbor base station from an upper network entity.

The signal strength measuring unit 420 receives reception signal information of neighbor base stations from the transceiver 410 to estimate RSSI from a neighbor base station. For example, the signal strength measuring unit 420 receives pilot information included in the reception signal from the transceiver 410 to estimate RSSI based on the pilot information.

The FA determining unit 400 transmits measured RSSI information of neighbor base stations to the neighbor base station via the transceiver 410, and receives received signal strength from the mobile base station, FA information, transmission power information, SF information, and such, from the neighbor base stations. In addition, the FA determining unit 400 determines FA to be used based on a first conditional equation or a second conditional equation using information from the neighbor base stations.

The SF determining unit 430 determines an SF determined based on a path loss and a shadowing log-normal standard deviation to provide the same to the FA determining unit 400. Because a method for estimating an SF departs from the scope of the present invention, detailed description thereof is omitted.

As described above, embodiments of the present invention have an advantage of securing a maximum capacity by adaptively setting FA with consideration of radio environments of neighbor base stations during network entry of a new mobile base station or an operation of a mobile base station.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for selecting Frequency Allocation (FA) in a mobile communication system, the method comprising:
   measuring at least one received signal strength indication (RSSI) for each neighbor base station,
   transmitting, to the each neighbor base station, first control information comprising first location information of a mobile base station and the at least one RSSI;
   receiving, from the each neighbor base station, second control information comprising second location information of the respective neighbor base station and at least one RSSI measured by the respective neighbor base station; and
   selecting the FA that maximizes a sum of the system capacities of the respective neighbor base stations, based on the first control information and the second control information.

2. The method of claim 1, further comprising the first control information comprising at least one of a Base Station Identification (BSID), FA, Reception (Rx) power, Transmission (Tx) power, and a Shadowing Factor (SF).

3. The method of claim 1, wherein the second control information comprises at least one of a Base Station Identification (BSID), FA, Reception (Rx) power, Transmission (Tx) power, and a Shadowing Factor (SF).

4. A method for selecting Frequency Allocation (FA) in a mobile communication system, the method comprising:
   receiving a first control information from neighbor base stations;
   determining system capacities of the respective neighbor base stations based on the first control information; and
   selecting the FA that maximizes a sum of the system capacities of the respective neighbor base stations,
   wherein the selecting of the FA comprises using the equation below:

$$FA_m = \operatorname{argmax}\left(\sum_{n=1}^{N} \log\left(\frac{1}{\sum_{i=1}^{I} g_{i\to n} P_{rx}^i(x, y) + N'}\right)\right),$$

where $P_{rx}^i(x, y)$ is reception power from a neighbor base station at a position (x,y) measured by an i-th base station, $g_{i\to n}$ is a function indicating whether FA of an n-th mobile base station and FA of an i-th mobile station are substantially the same, N is a number of all base stations of a system, I is a number of base stations adjacent to an n-th base station, and N' is a thermal noise.

5. A method for selecting Frequency Allocation (FA) in a mobile communication system, the method comprising:
   receiving a first control information from neighbor base stations;
   determining system capacities of the respective neighbor base stations based on the first control information; and
   selecting the FA that maximizes a sum of the system capacities of the respective neighbor base stations,
   wherein a reception signal from the neighbor base stations is determined by the equation below:

$$RxP_{k,m}(dB) = TxP_k(dB) + SF_k(dB) + PL(d_{km}) + SF_m(dB) + N(dB),$$

where $RxP_{k,m}(dB)$ is a reception signal from a mobile base station k and received by a mobile base station m, $TxP_k$ is a transmission power of the mobile base station k, $SF_k$ is a Shadowing Factor (SF) of the mobile base station k, $PL(d_{km})$ is a Path Loss (PL) between the mobile base stations k and m, $SF_m$ is a SF of the mobile base station m, and N(dB) is a terminal noise.

6. A method for selecting Frequency Allocation (FA) in a mobile communication system, the method comprising:
   receiving a first control information from neighbor base stations;
   determining system capacities of the respective neighbor base stations based on the first control information;
   selecting the FA that maximizes a sum of the system capacities of the respective neighbor base stations;
   receiving a second control information from the neighbor base stations; and
   selecting the FA that maximizes the sum of system capacities of the neighbor base stations based on the second control information,
   wherein the selecting the FA comprises using the equation below:

$$FA_m = \operatorname{argmax}\left(\sum_{n=1}^{N(m)} \log\left(\frac{1}{\sum_{i=1}^{I} g_{i\to n} P_{rx}^i(x, y) + N_{s_n}}\right)\right),$$

where $P_{rx}^i(x, y)$ is reception power from a neighbor base station at a position (x,y) measured by an i-th base station, $g_{i\to n}$ is a function indicating whether FA of an n-th mobile base station and FA of the i-th mobile station are substantially the same, $N_{s_k}$ is a thermal noise that reflects a Shadowing Factor (SF) of the n-th mobile base stations, and I is a number of base stations adjacent to an n-th base station.

7. A method for selecting Frequency Allocation (FA) in a mobile communication system, the method comprising:
   receiving a first control information from neighbor base stations;
   determining system capacities of the respective neighbor base stations based on the first control information;
   selecting the FA that maximizes a sum of the system capacities of the respective neighbor base stations;
   receiving a second control information from the neighbor base stations; and
   selecting the FA that maximizes the sum of system capacities of the neighbor base stations based on the second control information,
   wherein a reception signal from a mobile base station m, received by the neighbor base station is estimated using the equation below:

$$RxP_{m,k}(dB) = TxP_m(dB) + SF_m(dB) + PL(d_{mk}) + SF_k(dB) + N(dB) = TxP_m(dB) + RxP_{k,m}(dB) - TxP_k(dB),$$

where $RxP_{m,k}(dB)$ is a reception power between a mobile base station m and a mobile base station k, $TxP_m$ is a transmission power of the mobile base station m, $SF_m$ is a Shadowing Factor (SF) of the mobile base station m, $PL(d_{mk})$ is a Path Loss (PL) between the mobile base stations m and k, $SF_k$ is a SF of the mobile base station k, N(dB) is a terminal noise, and $TxP_k$ is a transmission power of the mobile base station k.

8. A method for selecting Frequency Allocation (FA) in a mobile communication system, the method comprising:
   measuring at least one received signal strength indication (RSSI) for each neighbor base station,
   transmitting, to the each neighbor base station, first control information comprising first location information of a mobile base station and the at least one RSSI;
   receiving, from the each neighbor base station, second control information comprising second location information of respective neighbor base station and at least one RSSI measured by the respective neighbor base station;
   selecting candidate neighbor base stations from the neighbor base stations based on the second control information; and
   selecting the FA that maximizes a sum of system capacities of the respective candidate neighbor base stations, based on the first control information and the second control information of each candidate neighbor base station.

9. The method of claim 8, wherein the first control information comprises at least one of a Base Station Identification (BSID), FA, Reception (Rx) power, Transmission (Tx) power, and a Shadowing Factor (SF).

10. The method of claim 8, wherein the second control information comprises at least one of a Base Station Identification (BSID), FA, Reception (Rx) power, Transmission (Tx) power, and a Shadowing Factor (SF).

11. A method for selecting Frequency Allocation (FA) in a mobile communication system, the method comprising:
   receiving a first control information from neighbor base stations;
   selecting candidate neighbor base stations from the neighbor base stations based on the first control information; and
   selecting the FA that maximizes a sum of system capacities of the respective candidate neighbor base stations,
   wherein the selecting of the FA comprises using the equation below:

$$FA_m = \text{argmax}\left(\sum_{n=1}^{N(m)} \log\left(\frac{1}{\sum_{i=1, i\neq m}^{I} g_{i\rightarrow n}P_{rx}^i + g_{m\rightarrow n}RxP_{m,n} + N}\right)\right),$$

where $P_{rx}^i(x, y)$ is reception power from a neighbor base station at a position (x,y) measured by an i-th base station, $g_{i\rightarrow n}$ is a function indicating whether FA of an n-th mobile base station and FA of the i-th mobile station are substantially the same, N is a terminal noise, N(m) is the number of sets of base stations for which at least one of reception power is not less than $RxP_{threshold}$ and a distance is less than $d_{threshold}$ at a mobile base station m, $RxP_{m,n}$(dB) is a reception power between a mobile base station m and a mobile base station n, and $g_{m\rightarrow n}$ is a function indicating whether FA of an n-th mobile base station and FA of the m-th mobile station are substantially the same.

12. A method for selecting Frequency Allocation (FA) in a mobile communication system, the method comprising:
receiving a first control information from neighbor base stations;
selecting candidate neighbor base stations from the neighbor base stations based on the first control information; and
selecting the FA that maximizes a sum of system capacities of the respective candidate neighbor base stations,
wherein a reception signal from the neighbor base stations is determined by the equation below:

$$RxP_{k,m}(dB)=TxP_k(dB)+SF_k(dB)+PL(d)+SF_m(dB)+N(dB),$$

where $RxP_{k,m}$(dB) is a reception signal from a mobile base station k and received by a mobile base station m, $TxP_k$ is a transmission power of the mobile base station k, $SF_k$ is a Shadowing Factor (SF) of the mobile base station k, $PL(d_{km})$ is a Path Loss (PL) between the mobile base stations k and m, $SF_m$ is a SF of the mobile base station m, and N(dB) is a terminal noise.

13. A method for selecting Frequency Allocation (FA) in a mobile communication system, the method comprising:
receiving a first control information from neighbor base stations;
selecting candidate neighbor base stations from the neighbor base stations based on the first control information;
selecting the FA that maximizes a sum of system capacities of the respective candidate neighbor base stations;
receiving a second control information from the neighbor base stations; and
selecting the FA that maximizes the sum of system capacities of the candidate neighbor base stations based on the second control information,
wherein second conditional equation for selecting the FA is defined by the equation below:

$$FA_m = \text{argmax}\left(\sum_{n=1}^{N(m)} \log\left(\frac{1}{\sum_{i=1}^{I} g_{i\rightarrow n}P_{rx}^i(x, y) + N_{s_n}}\right)\right),$$

where $P_{rx}^i(x, y)$ is reception power from a neighbor base station at a position (x,y) measured by an i-th base station, $g_{i\rightarrow n}$ is a function indicating whether FA of an n-th mobile base station and FA of the i-th mobile station are substantially the same, $N_{s_n}$ is a thermal noise that reflects a Shadowing Factor (SF) of the n-th mobile base stations, and I is a number of base stations adjacent to an n-th base station.

14. A method for selecting Frequency Allocation (FA) in a mobile communication system, the method comprising:
receiving a first control information from neighbor base stations;
selecting candidate neighbor base stations from the neighbor base stations based on the first control information; and
selecting the FA that maximizes a sum of system capacities of the respective candidate neighbor base stations,
wherein a reception signal from a mobile base station m, received by the neighbor base station is estimated using the equation below:

$$RxP_{m,k}(dB)=TxP_m(dB)+SF_m(dB)+PL(d_{mk})+SF_k(dB)+N(dB)=TxP_m(dB)+RxP_{k,m}(dB)-TxP_k(dB),$$

where $RxP_{m,k}$(dB) is a reception power between a mobile base station m and a mobile base station k, $TxP_m$ is a transmission power of the mobile base station m, $SF_m$ is a Shadowing Factor (SF) of the mobile base station m, $PL(d_{mk})$ is a Path Loss (PL) between the mobile base stations m and k, $SF_k$ is a SF of the mobile base station k, N(dB) is a terminal noise, and $TxP_k$ is a transmission power of the mobile base station k.

15. An apparatus for selecting Frequency Allocation (FA) in a mobile communication system, the apparatus comprising:
a transceiver configured to transmit, to each neighbor base station, first control information comprising first location information of a mobile base station and at least one received signal strength indication (RSSI) measured by the mobile base station, and receive, from the each neighbor base station, second control information comprising second location information of respective neighbor base station and at least one RSSI measured by the respective neighbor base station; and
an FA determining unit configured to select the FA that maximizes a sum of the system capacities of the respective neighbor base stations based on the first control information and the second control information.

16. The apparatus of claim 15, wherein the first control information comprises at least one of a Base Station Identification (BSID), FA, and Reception (Rx) power, Transmission (Tx) power, and a Shadowing Factor (SF).

17. The apparatus of claim 15, wherein the second control information comprises at least one of a Base Station Identification (BSID), FA, Reception (Rx) power, Transmission (Tx) power, and a Shadowing Factor (SF).

18. An apparatus for selecting Frequency Allocation (FA) in a mobile communication system, the apparatus comprising:
a transceiver configured to receive first control information from neighbor base stations; and
an FA determining unit configured to
determine system capacities of the respective neighbor base stations based on the first control information, and
select the FA that maximizes a sum of the system capacities of the respective neighbor base stations,
wherein the FA determining unit is further configured to select the FA using the equation below:

$$FA_m = \text{argmax}\left(\sum_{n=1}^{N} \log\left(\frac{1}{\sum_{i=1}^{I} g_{i \to n} P_{rx}^i(x, y) + N}\right)\right),$$

where $P_{rx}^i(x, y)$ is reception power from a neighbor base station at a position (x,y) measured by an i-th base station, $g_{i \to n}$ is a function indicating whether FA of an n-th mobile base station and FA of the i-th mobile station are substantially the same, N is a number of all base stations of a system, and I is a number of base stations adjacent to an n-th base station.

19. An apparatus for selecting Frequency Allocation (FA) in a mobile communication system, the apparatus comprising:
a transceiver configured to receive first control information from neighbor base stations; and
an FA determining unit configured to
determine system capacities of the respective neighbor base stations based on the first control information, and
select the FA that maximizes a sum of the system capacities of the respective neighbor base stations,
wherein a reception signal from the neighbor base stations is determined by the equation below:

$$RxP_{k,m}(dB) = TxP_k(dB) + SF_k(dB) + PL(d) + SF_m(dB) + N(dB),$$

where $RxP_{k,m}(dB)$ is a reception signal from a mobile base station k and received by a mobile base station m, $TxP_k$ is transmission power of the mobile base station k, $SF_k$ is a Shadowing Factor (SF) of the mobile base station k, $PL(d_{km})$ is a Path Loss (PL) between the mobile base stations k and m, $SF_m$ is a SF of the mobile base station m, and N(dB) is a terminal noise.

20. An apparatus for selecting Frequency Allocation (FA), the apparatus comprising:
a transceiver configured to receive first control information from neighbor base stations; and
an FA determining unit configured to:
determine system capacities of the respective neighbor base stations based on the first control information; and
select the FA that maximizes a sum of the system capacities of the respective neighbor base stations,
wherein the FA determining unit is further configured to select the FA using the equation below:

$$FA_m = \text{argmax}\left(\sum_{n=1}^{N(m)} \log\left(\frac{1}{\sum_{i=1}^{I} g_{i \to n} P_{rx}^i(x, y) + N_{s_n}}\right)\right),$$

where $P_{rx}^i(x, y)$ is reception power from a neighbor base station at a position (x,y) measured by an i-th base station, $g_{i \to n}$ is a function indicating whether FA of an n-th mobile base station and FA of the i-th mobile station are substantially the same, $N_{s_n}$ is a thermal noise that reflects a Shadowing Factor (SF) of the n-th mobile base stations, and I is a number of base stations adjacent to an n-th base station.

21. An apparatus for selecting Frequency Allocation (FA), the apparatus comprising:
a transceiver configured to receive first control information from neighbor base stations; and
an FA determining unit configured to:
determine system capacities of the respective neighbor base stations based on the first control information; and
select the FA that maximizes a sum of the system capacities of the respective neighbor base stations,
wherein a reception signal from a mobile base station m, received by the neighbor base station is estimated using the equation below:

$$RxP_{m,k}(dB) = P_m(dB) + SF_m(dB) + PL(d_{mk}) + SF_k(dB) + N(dB) = TxP_m(dB) + RxP_{k,m}(dB) - TxP_k(dB),$$

where $RxP_{m,k}(dB)$ is a reception power between a mobile base station m and a mobile base station k, $TxP_m$ is a transmission power of the mobile base station m, $SF_m$ is a Shadowing Factor (SF) of the mobile base station m, $PL(d_{mk})$ is a Path Loss (PL) between the mobile base stations m and k, $SF_k$ is a SF of the mobile base station k, N(dB) is a terminal noise, and $TxP_k$ is a transmission power of the mobile base station k.

22. An apparatus for selecting Frequency Allocation (FA, the apparatus comprising:
a transceiver configured to:
measure at least one received signal strength indication (RSSI) for each neighbor base station;
transmit, to the each neighbor base station, first control information comprising first location information of a mobile base station and the at least one RSSI; and
receive, from the each neighbor base station, second control information comprising second location information of respective neighbor base station and at least one RSSI measured by the respective neighbor base station; and
an FA determining unit configured to:
select candidate neighbor base stations from the neighbor base stations based on the second control information; and
select the FA that maximizes a sum of system capacities of the respective candidate neighbor base stations, based on the first control information and the second control information of each candidate neighbor base station.

23. The apparatus of claim 22, wherein the first control information comprising at least one of a Base Station Identification (BSID), FA, Reception (Rx) power, Transmission (Tx) power, and a Shadowing Factor (SF).

24. An apparatus for selecting Frequency Allocation (FA), the apparatus comprising:
a transceiver configured to receive first control information from neighbor base stations; and
an FA determining unit configured to
determine system capacities of the respective neighbor base stations based on the first control information, and
select the FA that maximizes a sum of the system capacities of the respective neighbor base stations,
wherein the FA determining unit is further configured to select the FA using the equation below:

$$FA_m = \text{argmax}\left(\sum_{n=1}^{N(m)} \log\left(\frac{1}{\sum_{i=1, i=m}^{I} g_{i \to n} P_{rx}^i + g_{m \to n} RxP_{m,n} + N}\right)\right),$$

where $P_{rx}^i(x, y)$ is reception power from a neighbor base station at a position (x,y) measured by an i-th base station, $g_{i \to n}$ is a function indicating whether FA of an n-th mobile base station and FA of the i-th mobile station are substantially the same, N is a terminal noise, N(m) is the number of sets of base stations for which at least one of reception power is not less than $RxP_{threshold}$ and a distance is less than $d_{threshold}$ at a mobile base station m, $RxP_{m,n}(dB)$ is a reception power between a mobile base station m and a mobile base station n, and $g_{m \to n}$ is a function indicating whether FA of an n-th mobile base station and FA of the m-th mobile base station are substantially the same.

25. An apparatus for selecting Frequency Allocation (FA), the apparatus comprising:
a transceiver configured to
measure at least one received signal strength indication (RSSI) for each neighbor base station;
transmit, to the each neighbor base station, first control information comprising first location information of a mobile base station and the at least one RSSI; and
receive, from each neighbor base station, second control information comprising second location information of respective neighbor base station and at least one RSSI measured by each neighbor base station;
a FA determining unit configured to:
determine system capacities of the respective neighbor base stations based on the second control information; and
select the FA that maximizes a sum of the system capacities of the respective neighbor base stations, based on the first control information and the second control information of each neighbor base station; and
wherein the first control information comprises at least one of a Base Station Identification (BSID), FA, Reception (Rx) power, Transmission (Tx) power, or location information.

26. An apparatus for selecting Frequency Allocation (FA), the apparatus comprising:
a transceiver configured to receive first control information from neighbor base stations; and
an FA determining unit configured to
determine system capacities of the respective neighbor base stations based on the first control information, and
select the FA that maximizes a sum of the system capacities of the respective neighbor base stations,
wherein a reception signal from the neighbor base stations is determined by the equation below:

$RxP_{k,m}(dB)=TxP_k(dB)+SF_k(dB)+PL(d_{k,m})+SF_m(dB)+N(dB)$, where $RxP_{k,m}(dB)$ is a reception signal from a mobile base station k and received by a mobile base station m, $TxP_k$ is a transmission power of the mobile base station k, $SF_k$ is a Shadowing Factor (SF) of the mobile base station k, $PL(d_{km})$ is a Path Loss (PL) between the mobile base stations k and m, $SF_m$ is a SF of the mobile base station m, and N(dB) is a terminal noise.

27. The apparatus of claim 26, wherein the FA determining unit is further configured to select the FA using the equation below:

$$FA_m = \text{argmax}\left(\sum_{n=1}^{N(m)} \log\left(\frac{1}{\sum_{i=1}^{I} g_{i \to n} P_{rx}^i(x, y) + N_{s_n}}\right)\right),$$

where $P_{rx}^i(x, y)$ is reception power from a neighbor base station at a position (x,y) measured by an i-th base station, $g_{i \to n}$ is a function indicating whether FA of an n-th mobile base station and FA of the i-th mobile station are substantially the same, $N_{s_n}$ is a thermal noise that reflects a Shadowing Factor (SF) of the n-th mobile base stations, and I is a number of base stations adjacent to an n-th base station.

28. The apparatus of claim 26, wherein the first control information comprises at least one of a Base Station Identification (BSID), FA, Reception (Rx) power, Transmission (Tx) power, and a Shadowing Factor (SF) information.

29. An apparatus for selecting Frequency Allocation (FA), the apparatus comprising:
a transceiver configured to receive first control information from neighbor base stations; and
an FA determining unit configured to:
determine system capacities of the respective neighbor base stations based on the first control information, and
select the FA that maximizes a sum of the system capacities of the respective neighbor base stations,
wherein a reception signal from a mobile base station m, received by the neighbor base station is estimated using the equation below:

$RxP_{m,k}(dB)=TxP_m(dB)+SF_m(dB)+PL(d_{mk})+SF_k(dB)+N(dB)=TxP_m(dB)+RxP_{k,m}(dB)-TxP_k(dB)$, where $RxP_{m,k}(dB)$ is a reception power between a mobile base station m and a mobile base station k, $TxP_m$ is a transmission power of the mobile base station m, $SF_m$ is a Shadowing Factor (SF) of the mobile base station m, $PL(d_{mk})$ is a Path Loss (PL) between the mobile base stations m and k, $SF_k$ is a SF of the mobile base station k, N(dB) is a terminal noise, and $TxP_k$ is a transmission power of the mobile base station k.

* * * * *